United States Patent
Ikeda et al.

(10) Patent No.: US 7,372,507 B2
(45) Date of Patent: May 13, 2008

(54) REAL-TIME CONTENT BASED GAMMA ADJUSTMENT FOR DIGITAL VIDEO DISPLAY

(75) Inventors: Roger M. Ikeda, Plano, TX (US); Jeffrey M. Kempf, Dallas, TX (US); David C. Hutchison, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 478 days.

(21) Appl. No.: 11/053,055

(22) Filed: Feb. 8, 2005

(65) Prior Publication Data

US 2006/0176407 A1    Aug. 10, 2006

(51) Int. Cl.
*H04N 5/202* (2006.01)
(52) U.S. Cl. .................................... 348/674
(58) Field of Classification Search ............. 348/674, 348/675, 254, 255; 345/63, 89
See application file for complete search history.

(56) References Cited

U.S. PATENT DOCUMENTS

| | | | |
|---|---|---|---|
| 4,984,072 A | | 1/1991 | Sandrew |
| 5,353,239 A | * | 10/1994 | Kashiwagi ................ 382/276 |
| 6,340,961 B1 | * | 1/2002 | Tanaka et al. ............ 345/63 |
| 6,340,994 B1 | * | 1/2002 | Margulis et al. ......... 348/625 |
| 7,081,906 B2 | * | 7/2006 | Kim et al. ................ 345/690 |
| 2005/0162361 A1 | * | 7/2005 | Chuang et al. ........... 345/89 |
| 2005/0213843 A1 | * | 9/2005 | Nojima et al. ........... 382/274 |

OTHER PUBLICATIONS

V. Markandey, T. Clatanoff, G. Pettitt, "Video Processing for DLP Display Systems" Digital Video Products, Texas Instruments, Inc., vol. 2666, pp. 21-32, Mar. 1996.

* cited by examiner

*Primary Examiner*—Paulos M. Natnael
(74) *Attorney, Agent, or Firm*—Wade James Brady, III; Frederick J. Telecky, Jr.

(57) ABSTRACT

Methods for improving video images by making real-time gamma correction adjustments to such images are described. More particularly, gamma correction adjustments may be optimized for each individual frame of a video image by first segregating the pixels of an image according to brightness. The segregated pixels may then be used in computing weighting calculations, which modify the transfer functions used for image display. In some embodiments, the video signal may be conditioned between the standard gamma curve and the S-shaped gamma curve used in mapping video signal input to intensity output. In this manner, frame-to-frame gamma correction adjustments can be made, thereby optimizing the resulting image. Related systems for making frame-to-frame gamma correction adjustments are also described.

21 Claims, 4 Drawing Sheets

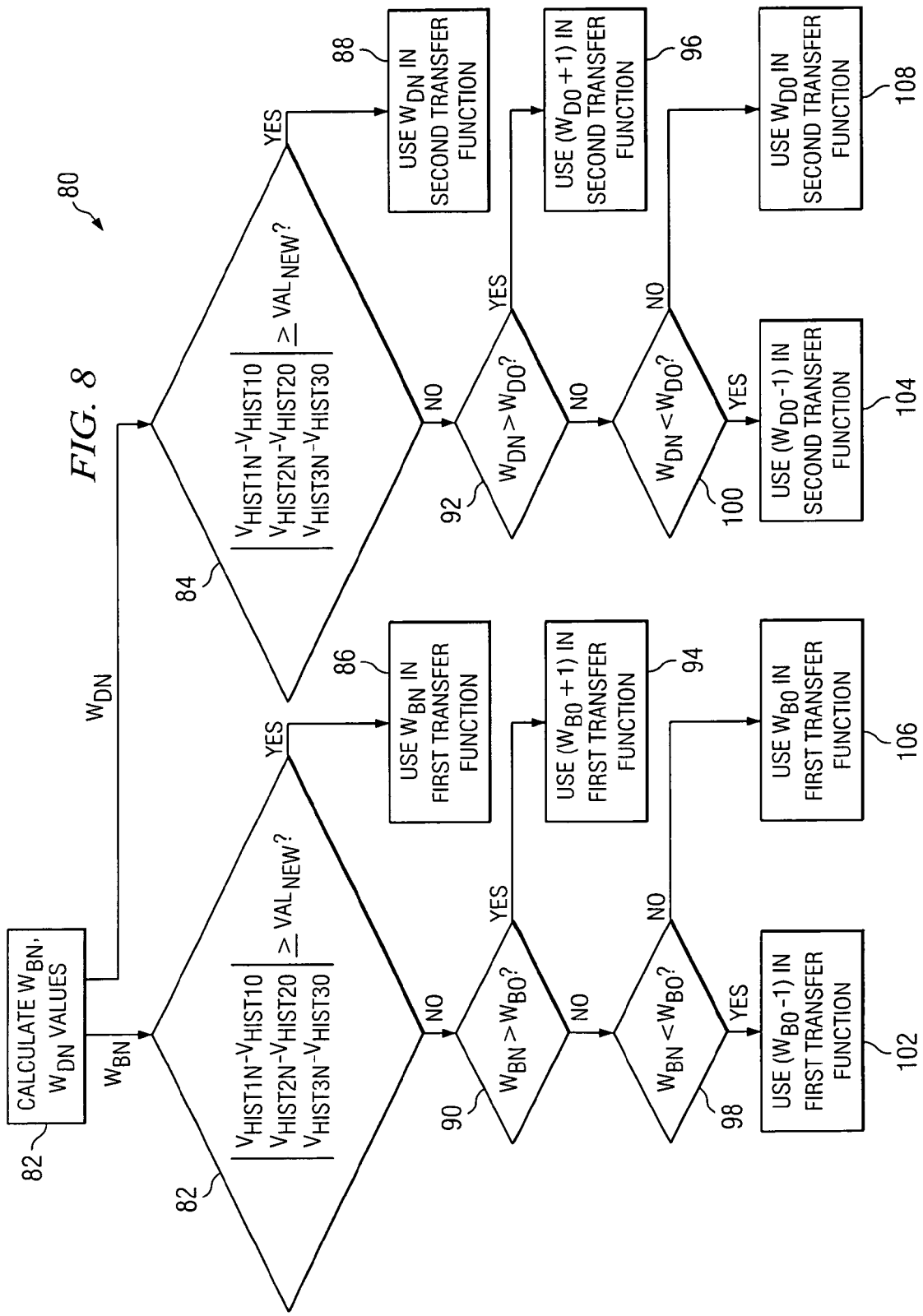

REAL-TIME CONTENT BASED GAMMA ADJUSTMENT FOR DIGITAL VIDEO DISPLAY

TECHNICAL FIELD

The present disclosure relates to real-time automated processes for performing frame-to-frame gamma correction adjustments in producing video images.

BACKGROUND

A variety of digital video processing technologies have evolved in recent years to meet the growing demand of the digital video display (e.g. digital television) market. One such technology that is continually being refined and improved is Digital Light Processing® technology, or DLP® technology, which provides all-digital projection displays that offer superior picture quality in terms of resolution, brightness, contrast, and color fidelity. Various DLP® solutions include progressive scan conversion, digital video resampling, picture enhancements, color processing, and gamma processing.

Gamma processing generally entails compensating for nonlinear signal-to-light characteristics. More particularly, the intensity of light generated by a physical device is not usually a linear function of the applied signal, thus requiring conditioning of the video signal to arrive at the desired output. Accordingly, technology has been developed to condition digital video signals to undergo a gamma correction process, which maps linear light intensity (the output image) to a non-linear voltage signal (the input video signal). The relationship between the input video signal and the light intensity output is often described in terms of a nonlinear transfer function.

Gamma correction can be implemented in a variety of ways depending on the image output desired by the manufacturer. For example, some implementations of gamma correction follow a standard gamma correction model, which is generally depicted as a parabolic curve 10 in FIG. 1. Standard gamma correction follows the 2.5 power law, which provides that the intensity produced at the face of the display is approximately the applied voltage, raised to the 2.5 power. However, it has been found that in some cases better contrast may be obtained through implementation of a gamma correction model having an "S-shaped" parabolic relationship 20 between the signal input and the light output, such as depicted in FIG. 2. While providing better contrast, these gamma correction models have poorer quality of excessively dark and excessively bright images. In essence, there is a tradeoff between better contrast for those images falling in the middle of the light intensity spectrum, and poorer contrast for those images lying on the fringes of this spectrum.

Gamma correction has heretofore been implemented at the front end of the video signal conditioning process. Manufacturers of digital televisions typically choose a particular gamma correction and implement this gamma correction during manufacture. Accordingly, the implemented gamma correction will remain the same regardless of the types of images displayed.

BRIEF SUMMARY

The present disclosure relates to improving video images by implementing systems and processes for making real-time gamma correction adjustments. In one embodiment, real-time gamma correction adjustments are implemented by receiving image frames embodied in a digital video signal into a field programmable gate array, or FPGA, which includes processes for segregating pixels according to brightness. The values of the segregated pixels are then used in conditioning the digital video signal in a gamma-shaping block. In particular, the transfer functions used in mapping the input signal to output intensity incorporate weighting calculations, which are calculated using the values developed by segregation of the pixels. Accordingly, gamma correction may be adjusted generally between the standard gamma curve and the S-shaped gamma curve. In this manner, frame-to-frame gamma correction adjustment can be made, thereby optimizing the resulting image.

In other embodiments, the weighting calculations may be adjusted depending on the continuity of the scene images. For example, the weighting calculations may be adjusted to account for small changes in frame-to-frame gamma correction when the images produced by the frames are part of a continuous scene. If a scene cut occurs, the weighting calculations may be used in corresponding transfer functions without adjustment.

BRIEF DESCRIPTION OF THE DRAWINGS

Reference is now made to the following descriptions taken in conjunction with the accompanying drawings, in which:

FIG. 8 is a process flowchart indicating a process for adjusting weighting calculations for any particular frame.

DETAILED DESCRIPTION

Digital video signals generally comprise a series of image frames, which include a large number of image pixels to formulate a desired image. These image frames are processed at a high rate of speed, typically on the order of several image frames per second (e.g. 60 frames per second). Image frames have heretofore been processed according to a constant nonlinear transfer function defining light intensity output in terms of the applied voltage video signal. The principles of the present disclosure, however, seek to improve a resulting video image by allowing for frame-to-frame image adjustment. In one aspect, frame-to-frame image adjustment may be accomplished by altering the nonlinear transfer function (graphically depicted as a gamma curve) between video signal input and light intensity output. In other words, the nonlinear transfer function can be altered for each image frame, thus allowing each image frame to have a tailored gamma correction for optimal image quality.

Figure 1:
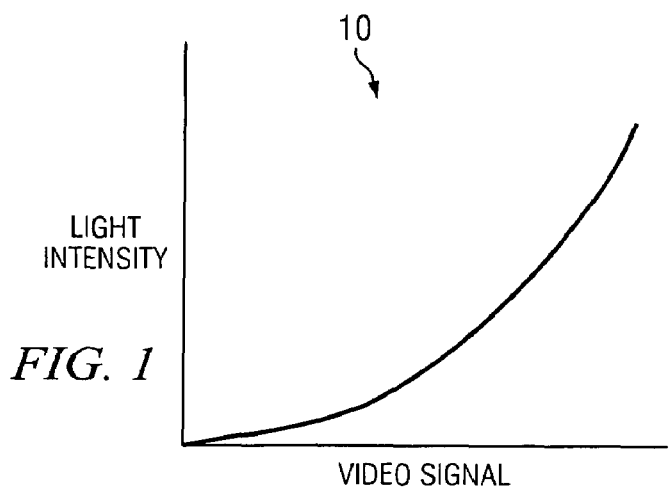
FIG. 1 is a graphical depiction of a standard gamma curve.
Figure 2:
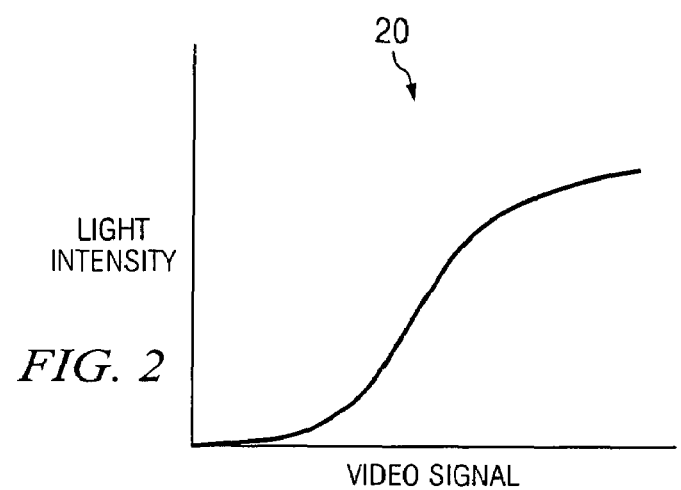
FIG. 2 is a graphical depiction of an S-shaped gamma curve.
Figure 3:
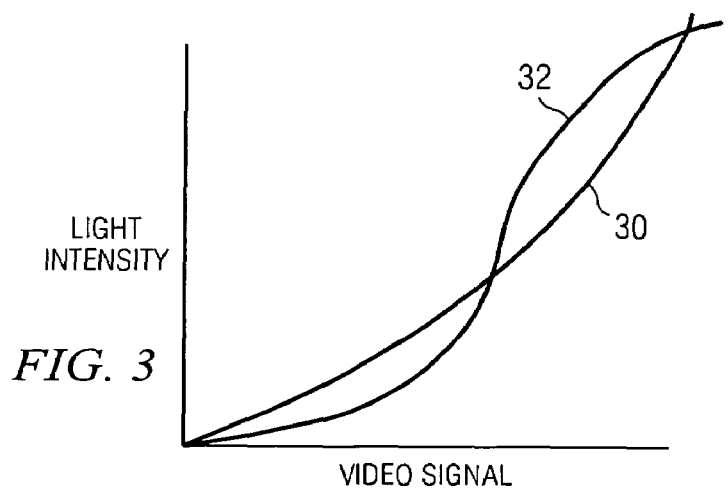
FIG. 3 is a graphical depiction of an S-shaped gamma curve laid over a standard gamma curve.

Referring to FIG. 3, in one embodiment, frame-to-frame gamma correction may vary between a standard gamma curve 30 and an S-shaped gamma curve 32. For example, image frames that have a large number of dark or light pixels will typically have better image quality when following the standard gamma curve 30 than when following the S-shaped gamma curve 32. However, image frames that comprise a large number of pixels falling between the extremes of excessively dark and bright images generally have better image quality when following the S-shaped gamma curve 32 than when following the standard gamma curve 30. Accordingly, it is desirable to incorporate a process during conditioning of a video signal that allows for adjustment of gamma correction between the standard gamma curve 30 and the S-shaped gamma curve 32 for each individual frame of a video image. The standard gamma curve 30 and the S-shaped gamma curve 32 as discussed herein do not correspond to defined nonlinear transfer functions. Rather, varying standard gamma curves and varying S-shaped gamma curves are contemplated as falling within the scope of this disclosure so long as varying standard gamma curves generally correspond in shape to the standard gamma curve 30 and varying S-shaped gamma curves generally correspond in shape to the S-shaped gamma curve 32.

Figure 4:
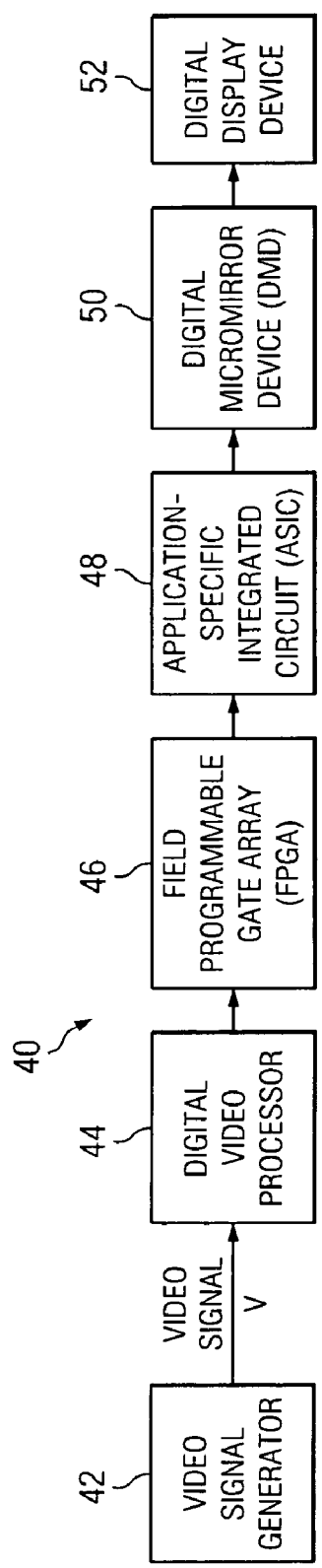
FIG. 4 is a block diagram of an exemplary hardware architecture for conditioning a video signal according to one embodiment of the present disclosure.

FIG. 4 illustrates an exemplary video signal path 40 for conditioning a video signal V to achieve frame-to-frame gamma correction adjustment. The video signal path 40 begins with transmission of a video signal V from a video signal generator 42. The video signal generator 42 may be any device capable of transmitting an analog or digital video signal, such as a cable box, a digital videodisc player, or a videocassette recorder. The video signal V feeds into a digital video processor 44, which conditions the video signal for digital output. The video signal V then feeds into a field programmable gate array (FPGA) 46, which includes various video-processing modules for manipulating the video signal as will be further described. After leaving the FPGA 46, the video signal V passes through an application specific integrated circuit (ASIC) 48, which converts the video signal into displayable bit planes. A digital micro mirror device (DMD) 50 receives the bit planes from the ASIC 48 and displays an image defined by the bit planes on a digital display device 52, such as a digital television. The term "digital television" is meant to include both television monitors and those digital televisions having built-in tuners.

In practice, the digital video processor 44, the FPGA 46, the ASIC 48, and the DMD 50 may all be provided inside the digital display device 52. More particularly, the FPGA 46 and ASIC 48 may be implemented via a printed circuit board housed within the digital display device 52. The foregoing video signal path 40 is only exemplary, and other hardware implementations are contemplated. For example, specific hardware implementations, such as the FPGA 46 and the ASIC 48, may be replaced or otherwise altered without departing from the scope of the disclosure. Also, the DMD 50 may be replaced with some other optoelectronic device, such as an LCD device. Still further, the digital display device 52 may be any digital video display device. For example, the digital display device 52 may be any digital display device other than a digital television, such as a plasma display or a cathode ray tube (CRT). The digital display device 52 may also be utilized in front projection systems.

Figure 5:
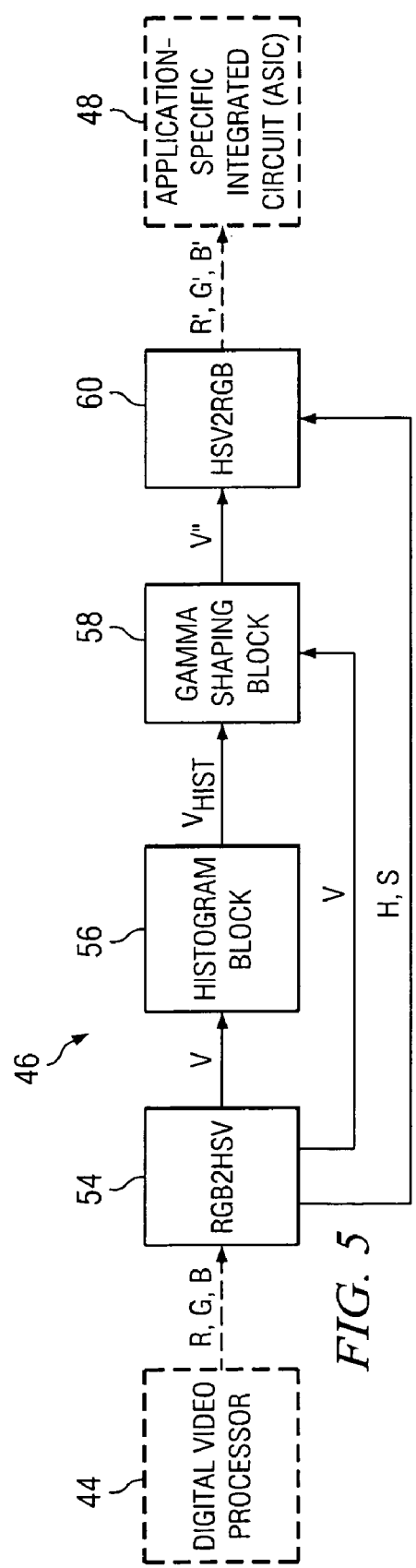
FIG. 5 is a block diagram of exemplary modules for performing frame-to-frame gamma correction.

In one embodiment, the FPGA 46 may include processes for conditioning the video signal V for frame-to-frame gamma correction adjustment. Referring to FIG. 5, the FPGA 46 includes an RGB2HSV block 54, which provides conventional color space conversion for the video signal V. The RGB2HSV block 54 generally converts color components R, G, B of the video signal V into hue, saturation, and value H, S, V components, which can be read and processed by subsequent conditioning modules. Two video paths leave the RGB2HSV block 54, with one path leading to a histogram block 56 and the other path leading to a gamma-shaping block 58. A third path depicts the hue H and saturation S components being transferred to a back-end conditioning block as will be further described. The histogram block 56 generally conditions the video signal V by segregating pixels of an image frame and transmitting the resulting information $V_{HIST}$ to the gamma-shaping block 58. The gamma-shaping block 58, in turn, performs additional conditioning processes on the video signal V received from the RGB2HSV block 54 using the information $V_{HIST}$ received from the histogram block 56. The resulting video signal output, V'', along with the hue H and saturation S components are then passed into an HSV2RGB block 60, which provides conventional color space conversion to R', G' and B' values. The R', G' and B' values are then passed to the ASIC 48 for further processing.

As discussed previously, the video signal V is conditioned on a frame-to-frame basis. Each frame comprises a predetermined amount of pixels depending on the input spatial resolution. In some embodiments, the number of pixels for any given frame can number in the millions. Each pixel has an associated intensity value, which falls within a certain range depending on the defined intensity resolution. For example, an 8-bit intensity resolution includes 256 different levels of intensity, which collectively form the image. Accordingly, each pixel is assigned a value between 0 and 255 to indicate the level of intensity associated with the pixel, wherein 0 indicates the lowest level of intensity (e.g. darkest pixel) and 255 indicates the highest level of intensity (e.g. brightest pixel). An exemplary embodiment will be described with respect to the conditioning of a video signal having 8-bit resolution images, but it is understood that the present disclosure equally applies to images of varying intensity resolutions.

Figure 6:
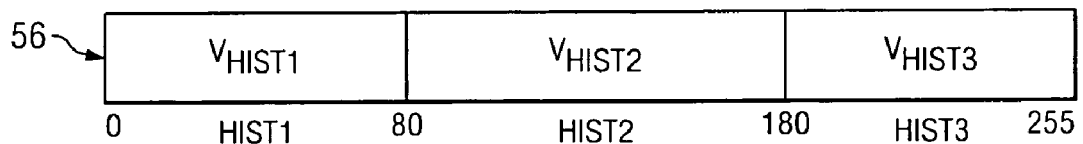
FIG. 6 is a schematic depiction of bins defined according to a histogram block of FIG. 5.

Referring to FIG. 6, the histogram block 56 may be set up to divide the individual pixels of any given frame into three separate bins—HIST 1, HIST 2, HIST 3. In this example, HIST 1 is categorized as receiving all pixels having an intensity value between 0 and 79, HIST 2 is categorized as receiving all pixels having an intensity value between 80 and 179, and HIST 3 is categorized as receiving all pixels having an intensity value between 180 and 255. The demarcations between HIST 1 and HIST 2 and between HIST 2 and HIST 3 may be arbitrarily defined, and therefore are not limited to the exemplary values indicated in FIG. 6. Separating pixels according to intensity gives a general idea as to the relative darkness or lightness of a particular frame. The $V_{HIST}$ values (i.e. $V_{HIST1}$, $V_{HIST2}$ and $V_{HIST3}$) of the three bins HIST 1, HIST 2, and HIST 3 are then transferred to the gamma-shaping block 58 (FIG. 5) for manipulation of the video signal V.

Figure 7:
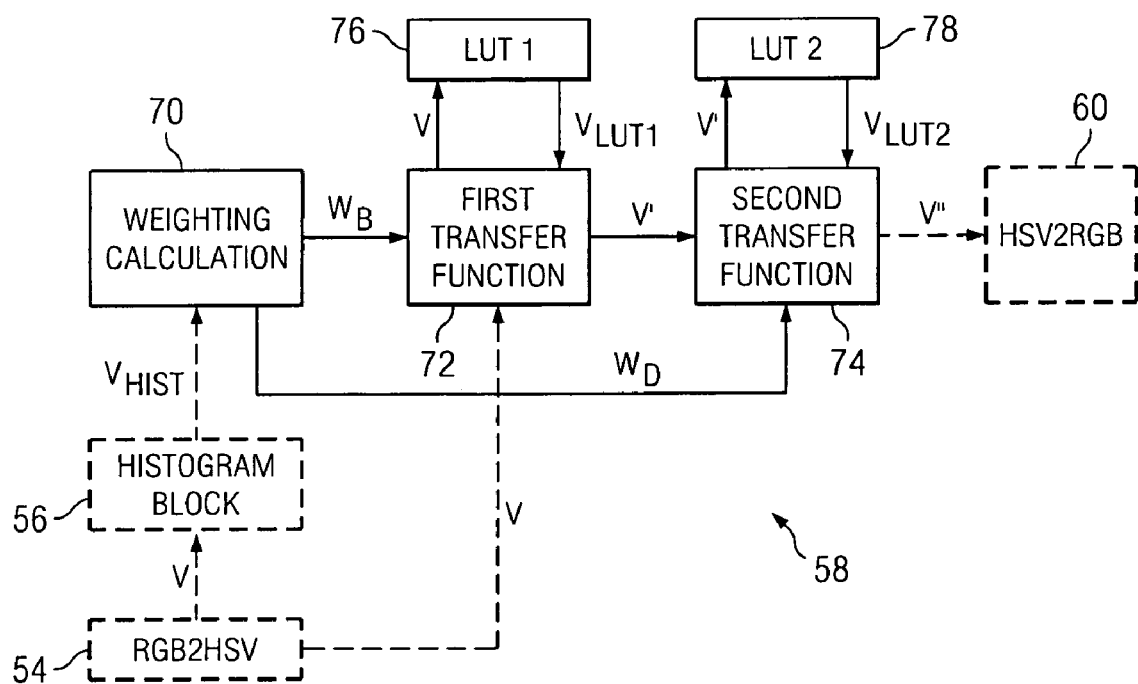
FIG. 7 is a block diagram illustrating processes carried out within a gamma-shaping block of FIG. 5.

Referring again to FIG. 5, the video signal V is not only sent from the RGB2HSV block 54 to the histogram block 56, but is also sent directly from the RGB2HSV block to the gamma-shaping block 58. Referring to FIG. 7, the gamma-shaping block 58 conditions the video signal V to undergo transfer functions to map the digital video signal to an output light intensity. In some embodiments, it may not be desirable to make sharp gamma correction adjustments, which may occur between frames having marked differences in intensity resolution. Such gamma correction adjustments may lead to poor image quality. Accordingly, in an effort to produce gradual and smooth frame-to-frame gamma correction adjustments, weighting calculations 70 may be determined according to the $V_{HIST}$ values supplied by the histogram block 56. These weighting calculations are then incorporated into the transfer functions to ensure smooth frame-to-frame gamma correction adjustments.

The weighting calculations 70 generally produce two values—$W_B$ and $W_D$, which when applied to first and second transfer functions 72 and 74, respectively, dictate the amount of transfer function to apply to the input video signal V and V', respectively. The $W_B$ and $W_D$ values may be calculated according to different bit weights. In this example, the $W_B$ and $W_D$ values are calculated in 8-bit weights. More particularly, the $W_B$ value is calculated by first multiplying the number of dark pixels ($V_{HIST1}$) by a user-defined parameter, typically provided by an original equipment manufacturer of the digital display device 52 (FIG. 4). This value is then subtracted from 256:

$$W_B = (256 - [V_{HIST1} * \text{user-defined parameter}])$$

The $W_D$ value may be calculated in a similar manner by first multiplying the number of light pixels ($V_{HIST3}$) by a user-defined parameter, again, typically provided by an original equipment manufacturer of the digital display device 52 (FIG. 4). This value is then subtracted from 256:

$$W_D = (256 - [V_{HIST3} * \text{user-defined parameter}])$$

The $W_B$ value is used in manipulating a $V_{LUT1}$ value returned from a first lookup table (LUT 1) 76. The video signal V received by the first transfer function 72 is also 8-bit weighted and has a defined value falling somewhere between 0 and 255. The first transfer function 72 sends this value for the video signal V to the first lookup table 76, which returns a LUT 1 value ($V_{LUT1}$) to the first transfer function. In practice, LUT 1 values are programmable values that correspond to weighted input values. In one example, if V were to equal 55, the LUT 1 would return a value $V_{LUT1}$ corresponding to the 55$^{th}$ entry in the LUT 1. The first transfer function 72 further processes the video signal V to arrive at an output video signal V' by multiplying $V_{LUT1}$ by the $W_B$ value and dividing the returned value by 256. This value is then added to V to arrive at V'. Accordingly, V' may be calculated as follows:

$$V' = V + \frac{(V_{LUT1} * W_B)}{256}$$

The V' value is then transferred into the second transfer function 74, which sends the V' value to a second lookup table (LUT 2) 78. As with the video signal V, the V' value is 8-bit weighted and has a defined value falling somewhere between 0 and 255. The second lookup table 78 returns a LUT 2 value ($V_{LUT2}$) to the second transfer function. From here, the second transfer function 74 further processes the video signal V' to arrive at an output video signal V" by multiplying $V_{LUT2}$ by the $W_D$ value and dividing the returned value by 256. This value is then added to V' to arrive at V". Accordingly, V" may be calculated as follows:

$$V'' = V' + \frac{(V_{LUT2} * W_D)}{256}$$

Therefore, each frame is processed to have an output video signal V" that has an optimal gamma correction for the particular image displayed by the frame. Referring again to FIG. 4, the video signal V" leaves the FPGA 46 and enters the ASIC 48, which further conditions the video signal V" before transmitting the signal to the DMD 50 and ultimately the digital display device 52.

As discussed above, the weighting calculation values $W_B$ and $W_D$ are used in tailoring an appropriate gamma correction for a particular frame. However, a gamma correction for a subsequent frame may be substantially different than the preceding frame, thus leading to an undesirable resulting video image. Accordingly, the weighting calculations 70 may be manipulated to ensure a smooth transition between gamma corrections for adjacent frames. Referring to FIG. 8, an additional process 80 may be implemented into the gamma-shaping block 58, and more particularly, into the weighting calculation 70, for adjusting the weighting calculation values $W_B$ and $W_D$ for each subsequent frame. In one embodiment, the process 80 generally involves application of an algorithm for evaluating the weighting calculations values $W_B$ and $W_D$ for a current frame against the weighting calculation values $W_B$ and $W_D$ for the previous frame. For the sake of clarity, the current weighting calculation values are referred to as $W_{BN}$ and $W_{DN}$ and the previous weighting calculation values are referred to as $W_{BO}$ and $W_{DO}$.

The process 80 begins with calculating the $W_{BN}$ and $W_{DN}$ values 82 for the current frame. Each of the $W_{BN}$ and $W_{DN}$ values are then evaluated to determine the ultimate weighting calculations $W_B$ and $W_D$, which will be applied in determining V', and ultimately, V". However, prior to evaluating the $W_{BN}$ and $W_{DN}$ values, a determination should be made as to whether adjustment of the $W_{BN}$ and $W_{DN}$ values is desired. For example, drastic changes in gamma correction may occur at a scene cut (i.e. changing of one scene of a video to a different scene of the video). In these instances, drastic changes in gamma correction will not adversely affect the quality of the resulting image because continuity of images will not be an issue. Scene cuts generally correspond to large changes in the $V_{HIST}$ values described above. Accordingly, the $V_{HIST}$ values for a current frame can be compared with the $V_{HIST}$ values for the previous frame to determine if there has been a large enough change in any of the $V_{HIST}$ values to merit a large gamma correction difference between frames. In one embodiment, if any of the $V_{HIST}$ values (i.e. for any one of the three bins) is larger than a certain $VAL_{NEW}$ value 82, 84, then the weighting calculation will forego any further processing and the current weighting calculation $W_B$, $W_D$, respectively may be used in the transfer function 86, 88, respectively. The $VAL_{NEW}$ value may be any prescribed value, which represents a large enough change in $V_{HIST1}$, $V_{HIST2}$, or $V_{HIST3}$ values to indicate that a scene cut has taken place. If none of the changes in $V_{HIST}$ values rise above the $VAL_{NEW}$ value, then further evaluation of the weighting calculation values takes place.

Assuming that none of the changes in $V_{HIST}$ values rises above the $VAL_{NEW}$ value, the current $W_{BN}$ and $W_{DN}$ values are then evaluated against the previous $W_{BO}$ and $W_{DO}$ values, respectively. For example, the current $W_{BN}$ and $W_{DN}$ values may be evaluated to determine if they are larger than the respective previous $W_{BO}$ and $W_{DO}$ values 90, 92. If the current $W_{BN}$ and $W_{DN}$ values are greater than the respective $W_{BO}$ and $W_{DO}$ values, then the weighting calculations to be introduced into the respective transfer functions may be calculated as $W_{BO}+1$ (94) and $W_{DO}+1$ (96). Similarly, the current $W_{BN}$ and $W_{DN}$ values may be compared against the previous $W_{BO}$ and $W_{DO}$ values to evaluate whether the current $W_{BN}$ and $W_{DN}$ values are lesser than the respective $W_{BO}$ and $W_{DO}$ values 98, 100. If the $W_{BN}$ and $W_{DN}$ values are lesser than the respective $W_{BO}$ and $W_{DO}$ values, then the weighting calculations to be introduced into the respective transfer functions may be calculated as $W_{BO}$-1 (102) and $W_{DO}$-1 (104). Of course, should the current $W_{BN}$ and $W_{DN}$ values equal the previous $W_{BO}$ and $W_{DO}$ values, the previous $W_{BO}$ and $W_{DO}$ values 106, 108 may be used in the respective transfer functions. In this manner, large changes in weighting calculations within continuous scenes will not translate into sharp changes in gamma corrections. Also, in some instances, the $W_{BN}$ value may increase relative to the previous $W_{BO}$ value, while the $W_{DN}$ value decreases relative to the previous $W_{DO}$ value. Accordingly, an increase in one value does not necessarily correspond to an increase in the other value. Rather, each weighting calculation $W_{BN}$ value is independent of the $W_{DN}$ value for the same frame.

While various embodiments for making frame-to-frame gamma correction adjustments according to the principles disclosed herein have been described above, it should be understood that they have been presented by way of example only, and not limitation. For example, weighting calculation adjustments have been described with respect to certain finite adjustments. However, the precise frame-to-frame adjustments may vary beyond the described embodiments. Thus, instead of adding or subtracting "1" to a determined weighting calculation, the weighting calculation may be modified in other manners without departing from the scope of this disclosure. Still further, the equations described with respect to calculating the output voltage signal may vary and are not meant to limit this disclosure to any particular embodiment. For example, different image resolutions may account for changes to these equations. Rather, the following claims should be construed broadly to cover any embodiment tailored to achieve frame-to-frame adjustment of gamma correction. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for processing digital video images prior to display, comprising:
   receiving a digital video signal having video images definable in frames; and
   conditioning the digital video signal to prescribe a gamma correction for each frame, the gamma correction being adjustable from frame to frame, wherein the conditioning of the digital video signal comprises adjusting the digital video signal according to a transfer function separable into a first transfer process and a second transfer process.

2. A method according to claim 1 wherein the receiving of the digital video signal comprises receiving a video signal from a video signal generator, processing the video signal into a digital video signal, and transmitting the digital video signal for further conditioning.

3. A method according to claim 1 wherein the gamma correction is adjustable between a standard gamma correction and an S-shaped gamma correction.

4. A method according to claim 1 wherein the conditioning of the digital video signal comprises evaluating the relative brightness of each frame, and adjusting the gamma correction for each frame according to the relative brightness of each frame.

5. A method according to claim 1 wherein the conditioning of the digital video signal comprises computing weighting calculations and applying the weighting calculations to the digital video signal during the first and second transfer processes.

6. A method according to claim 5 wherein the weighting calculations for a current frame are evaluated against weighting calculations for a preceding frame to determine appropriate weighting calculations to be used in the first and second transfer processes.

7. A method according to claim 1 wherein the conditioning of the digital video signal comprises segregating pixels of each frame into one of three bins, the pixels being segregated according to brightness.

8. A method according to claim 7 wherein each bin receives a certain number of pixels according to flexible bin boundaries, the number of pixels in a first bin being defined as a first bin value and generally corresponding to dark pixels and the number of pixels in a second bin being defined as a second bin value and generally corresponding to bright pixels, wherein conditioning the digital video signal further comprises feeding the first and second bin values into a weighting calculation algorithm.

9. A method according to claim 8 wherein the conditioning of the digital video signal further comprises performing weighting calculations using the first and second bin values to compute first and second weighting calculation values, respectively.

10. A method according to claim 9 wherein the conditioning of the digital video signal further comprises manipulating the digital video signal according to a first lookup table, and further manipulating the digital video signal according to the first weighting calculation value to arrive at a first transfer function digital video signal.

11. A method according to claim 10 wherein the conditioning of the digital video signal further comprises manipulating the first transfer function digital video signal according to a second lookup table, and further manipulating the first transfer function digital video signal according to the second weighting calculation value to arrive at a second transfer function digital video signal.

12. A method according to claim 11 wherein the second transfer function digital video signal is the digital video signal with an incorporated gamma correction.

13. A method for producing video images for display on a digital display device, comprising:
- generating a digital video signal, the digital video signal being definable in frames;
- inputting the digital video signal into a processing device, the processing device being capable of making frame-to-frame gamma correction adjustments to the digital video signal according to a transfer process separable into a first transfer process and a second transfer process; and
- transferring the adjusted digital video signal into displayable bit planes.

14. A method according to claim 13 wherein the frame-to-frame gamma correction adjustments are adjustable between a standard gamma correction and an S-shaped gamma correction.

15. A method according to claim 13 wherein the processing device conditions the digital video signal by evaluating the relative brightness of each frame, and adjusting the gamma correction for each frame according to the relative brightness of each frame.

16. A method according to claim 13 wherein the processing device conditions the digital video signal according to a transfer process.

17. A digital video display device, comprising:
- a video processor for processing an input video signal into an output digital video signal, the output digital video signal being definable in frames; and
- a processing device for receiving the digital video signal from the video processor, the processing device being operable to condition the output digital video signal to make frame-to-frame gamma correction adjustments according to a transfer process separable into a first transfer process and a second transfer process.

18. A digital video display device according to claim 17 wherein the processing device is a field programmable gate array.

19. A digital video display device according to claim 17 wherein the processing device includes processes for evaluating the relative brightness of each frame and adjusting the digital video signal according to the relative brightness of each frame.

20. A digital video display device according to claim 19 wherein the processing device further includes processes for adjusting the digital video signal to ensure smooth frame-to-frame gamma correction adjustments.

21. A digital video display device according to claim 17 wherein the processing device includes processes for adjusting the gamma correction for each frame between a standard gamma correction and an S-shaped gamma correction.

* * * * *